UNITED STATES PATENT OFFICE.

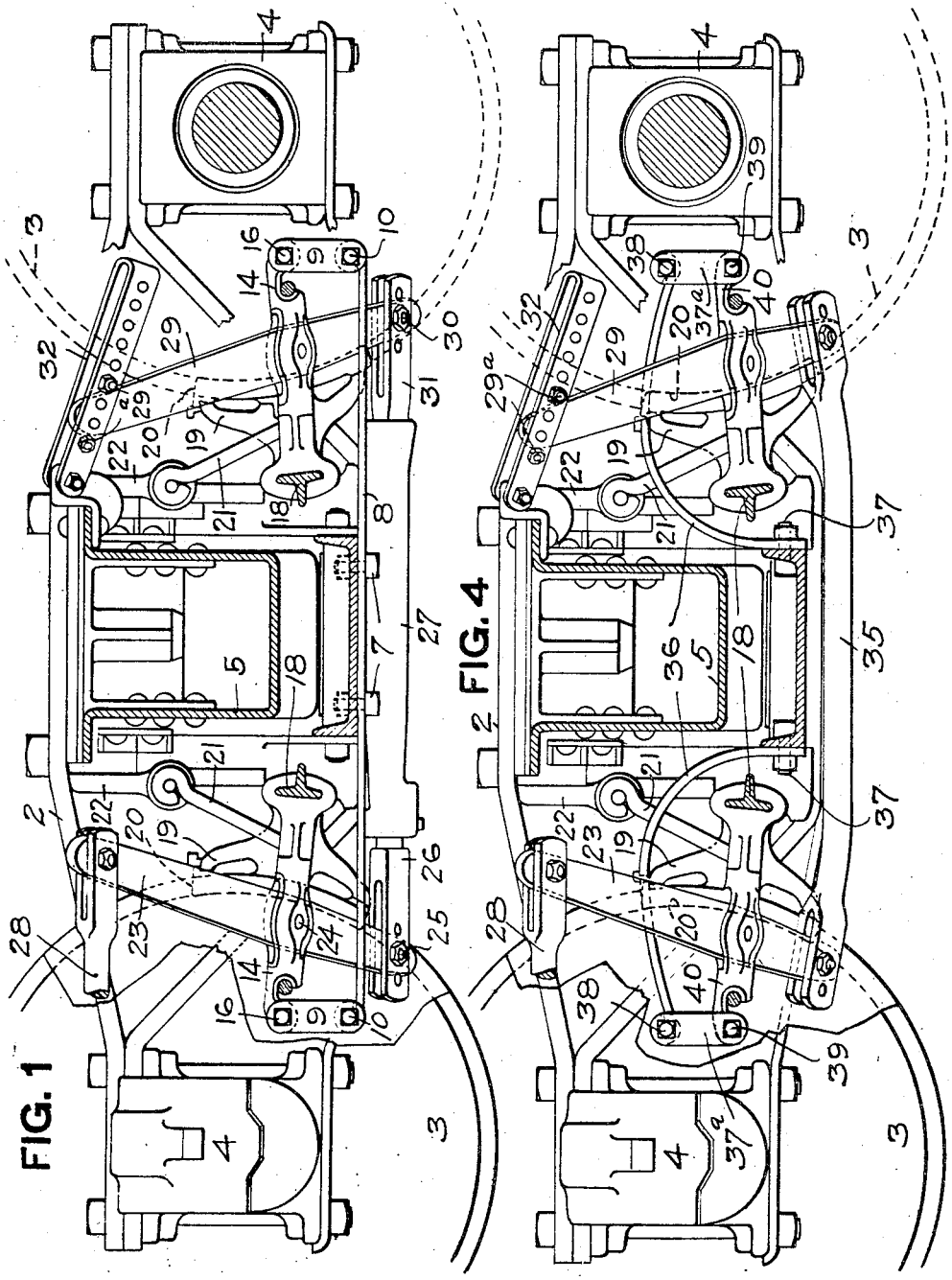

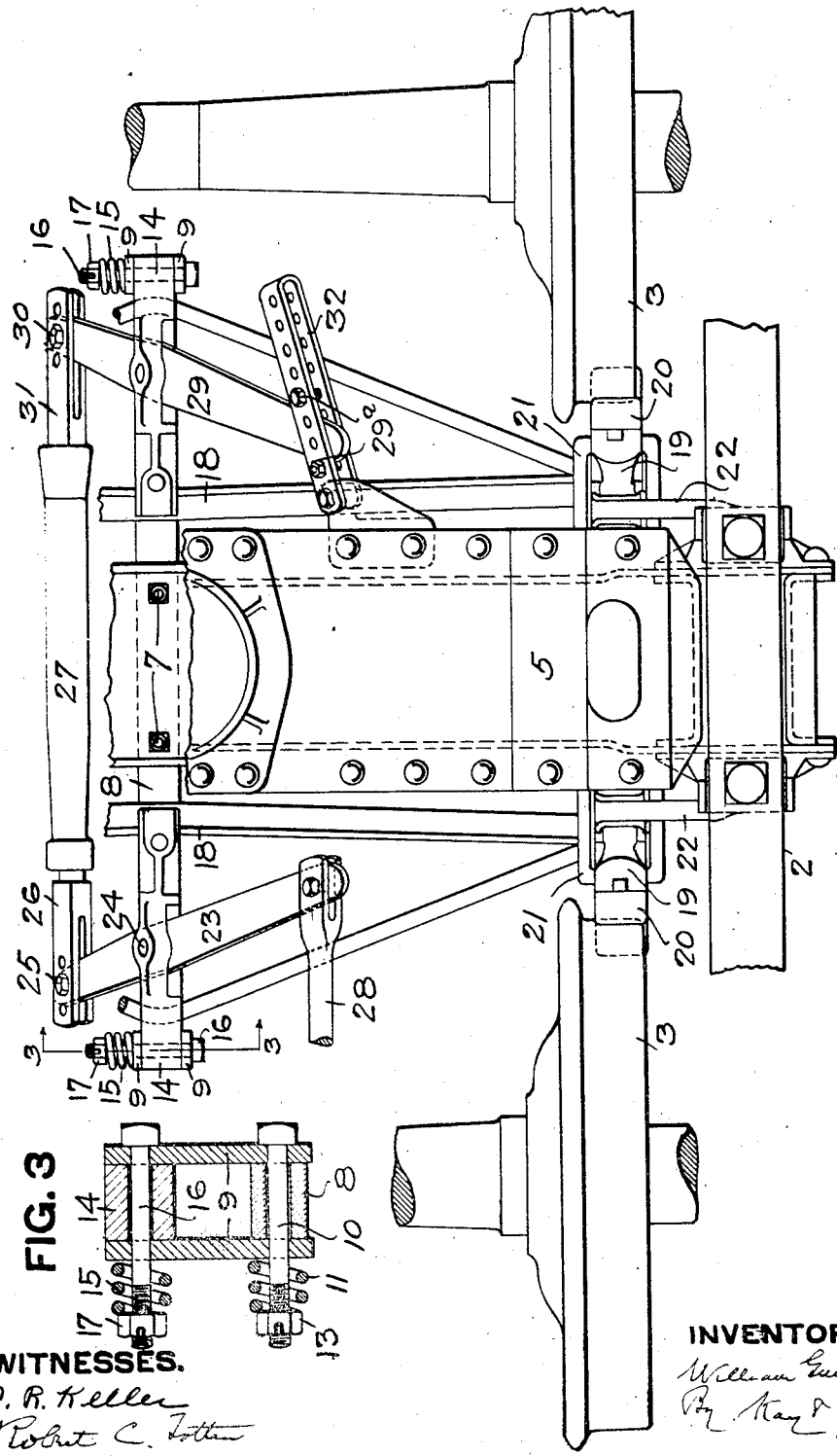

WILLIAM GUNN PRICE, OF NEW CASTLE, PENNSYLVANIA.

BRAKE-RIGGING.

1,064,249. Specification of Letters Patent. Patented June 10, 1913.

Application filed March 2, 1910. Serial No. 546,844.

*To all whom it may concern:*

Be it known that I, WILLIAM GUNN PRICE, a resident of New Castle, in the county of Lawrence and State of Pennsylvania, have invented a new and useful Improvement in Brake-Rigging; and I do hereby declare the following to be a full, clear, and exact description thereof.

My invention relates to brake-rigging, its object being to provide a construction in which the brake-shoes are held up in proper alinement with the tread of the wheels so that the faces of the brake-shoes bear in contact at all points with the tread of the wheel and release at all points from the tread of the wheel, and are prevented from dragging on the wheels.

A further object is to provide friction means for causing to operate an automatic brake slack adjuster.

To these ends my invention comprises, generally stated, in conjunction with a suitable truck, the wheels and the other parts going to make up such a structure, of a brake-beam, shoes supported thereby, a brake-lever fulcrum connected to said brake-beam, a brake-lever, links connected to one end of said brake-lever fulcrum, and the opposite end supported by the truck, said links being yieldingly mounted to move vertically or in any position convenient to resist the rotation of the brake-beam on its hangers, as a pivot.

In the drawings, Figure 1 is a side elevation of the truck partly in section, showing my invention applied thereto; Fig. 2 is a plan view of a portion of the truck; Fig. 3 is an enlarged section on the line 3—3, Fig. 2; and Fig. 4 is a modified form of my invention.

In the drawings the numeral 2 designates a suitable truck provided with wheels 3, axle-boxes 4, the transoms 5, and other necessary parts which go to make up a truck of this character. Secured to the transoms 5 by the bolts 7 is the spring-plate 8 which may consist of a single leaf-spring having the requisite resiliency for the purposes more fully hereinafter set forth. Connected to the outer ends of the spring-plate 8 are the links 9, the connection between said spring and links being made by bolts 10. The outer end of the spring plate 8 is bent around to form an opening for the passage of the bolt 10. Coiled spring 11 is inserted between one of the links 10 and the nut 13 on the bolt for the purpose fully hereinafter set forth. The opposite ends of the links 9 are connected to the outer ends of the brake-beam fulcrums 14. The coiled springs 15 surround the bolts 16 which connect the upper ends of the links 9, and said springs are interposed between one of the links 10 and the nut 17 on the bolts 16.

Brake-beams 18 are connected to the brake-beam fulcrums 14 and said brake-beams are provided with the heads 19 carrying the brake-shoes 20. The brake-beam 18 together with the brake-heads 19 and shoes 20 are supported by the hangers 21 which are suspended from the brackets 22 which are supported by the transoms or truck frame.

The live-lever 23 is connected to the brake-beam fulcrum 14 by the bolt 24 and said lever is connected at its lower end by the bolt 25 to the movable member 26 of the suitable automatic slack adjuster 27. Any suitable form of automatic slack adjuster may be employed, and it is not deemed necessary to illustrate the same in detail, but such slack adjuster may be found illustrated and described in Letters Patent of the United States No. 951,577, granted the 8th day of March, 1910, to Wm. K. Price. The upper end of the lever 6 is connected to the brake-rod 28.

The dead-lever 29 is connected by the bolt 30 to the member 31 of the slack-adjuster 27. The upper end of the dead-lever 29 is held within the guide-bracket 32 and rests between the bolts 29ᵃ.

When my invention is in use the spring-plate 8 acting through the links 9 and brake-beam fulcrum 14 supports the brake-beams against rotation and so holds the shoes in proper position in alinement with the tread of the wheels as to properly conform thereto when in the released position and not to drag at any point on the wheels. When the brake-shoes are forced against the wheels by the application of the brakes, the resiliency of the plate 8 will permit the brake-beams and shoes to rotate on the hangers 21 to the position required for the shoes to fit or lie in alinement with the treads of the wheels, thus insuring the greatest efficiency from the frictional contact of the shoes with the wheels. When the automatic slack-adjuster is employed, the friction caused by the springs 11 creates sufficient resistance to retard the movement of the brake-beams and shoes away from the wheels so that when the brake-rod 28 moves toward the bolster when the brakes are released, the live-lever does not move away from the wheel at the point where it is attached to the brake-beam fulcrum and the lower end of the live-lever is caused to move toward the wheel, thus pulling the member 26 of the slack-adjuster 27 outwardly, which permits the said slack-adjuster to take up the slack, if any, due to wear of the brake-shoes.

In Fig. 4 I have illustrated my invention in connection with brake-rigging in which the automatic slack-adjuster is omitted and the solid bar 35 connects the lower ends of the live and dead-levers. I have further modified the construction illustrated in Fig. 1 by the employment of the curved spring members 36 which are secured by bolts 37 to the truck-frame. These spring members are connected to the links 37 at their upper ends by means of the bolts 38, while bolts 39 connect the lower ends of the links 37 to the brake-beam fulcrum 40. Otherwise the construction is the same as that illustrated in Fig. 1. The operation, however, will be the same, the only point of difference being that there is no automatic taking up of the slack due to the wear of the brake-shoe.

It is apparent that the above construction may be modified or changed in many ways without departing from the spirit of my invention, and I do not wish to limit myself in any sense to the construction illustrated and described.

What I claim is:

1. In brake-rigging, the combination with a suitable truck-frame, and wheels, of a brake-beam supported thereby, brake-shoes, a brake-beam fulcrum connected to said brake-beam, vertically yielding pivotally mounted links supported by said truck-frame, and pivotally connected to said brake-beam fulcrum, friction producing means at said pivotal points, and brake operating mechanism.

2. In brake-rigging, the combination with suitable truck-frame and its wheels, of a brake-beam supported thereby, brake-shoes, a brake-beam fulcrum, a vertically yielding link supported by said truck-frame, pivotal bolts connecting said link to said truck frame and to said brake-beam fulcrum, frictional springs on said bolts, and brake operating mechanism.

3. In brake-rigging for car trucks, the combination with suitable truck-frame and its wheels of a brake-beam supported thereby, brake-shoes, a brake-beam fulcrum, a link spring supported by said truck-frame, pivotal bolts connecting said link to said truck frame and to said brake-beam fulcrum, friction producing springs on said bolts, and brake operating mechanism.

4. In brake-rigging, the combination with a suitable truck-frame and its wheels, of a brake-beam supported thereby, brake-shoes, a brake-beam fulcrum, a yielding friction producing link connecting the brake-beam fulcrum to the truck-frame, a slack-adjuster, the yielding friction producing links acting with the slack-adjuster to take up the slack of the brake shoes.

5. In brake-rigging, the combination with a suitable truck frame and its wheels, of a brake beam supported thereby, brake-shoes, a brake-beam fulcrum, a spring supported friction producing link connecting the brake-beam fulcrum to the truck frame, an automatic slack-adjuster, the spring supported friction producing link acting with the automatic slack-adjuster to take up the slack of the brake-shoes.

6. In a brake-rigging having brake-beams, brake-shoes, brake-beam fulcrums, spring supported friction producing links, and an automatic brake slack-adjuster, the spring supported friction producing links acting with the automatic brake slack adjuster to take up the slack of the brake-shoes.

In testimony whereof, I the said WILLIAM GUNN PRICE have hereunto set my hand.

WILLIAM GUNN PRICE.

Witnesses:
ROBERT C. TOTTEN,
J. F. WILL.